(12) United States Patent
Clapper (10) Patent No.: US 6,597,857 B1
(45) Date of Patent: Jul. 22, 2003

(54) INTERRUPTING PLAY OF AUDIO/VISUAL INFORMATION

(75) Inventor: Edward O. Clapper, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/386,975

(22) Filed: Aug. 31, 1999

(51) Int. Cl.⁷ .............................. H04N 7/00; H04N 7/04; G11B 27/00
(52) U.S. Cl. ................. 386/46; 386/96; 386/52
(58) Field of Search ......................... 386/46, 83, 1, 386/52, 4, 55, 124, 125, 126, 45, 40, 95, 96, 104, 105, 106; 360/32; H04N 7/00, 7/04; G11B 27/00

(56) References Cited

U.S. PATENT DOCUMENTS

| | | | |
|---|---|---|---|
| 4,771,410 A | * 9/1988 | Kolibaba et al. | |
| 5,134,499 A | * 7/1992 | Sata et al. | |
| 5,469,270 A | * 11/1995 | Yamamoto | |
| 5,699,323 A | * 12/1997 | Nohara et al. | |
| 5,852,593 A | * 12/1998 | Ishida et al. | |

\* cited by examiner

*Primary Examiner*—Robert Chevalier
(74) *Attorney, Agent, or Firm*—Trop, Pruner & Hu, P.C.

(57) ABSTRACT

A processor-based system for controlling the play of audio/visual information can be set to automatically respond to an interruption command. An interruption command may include either mute, pause or a combination of the two. The user may be provided with a graphical user interfaces which enable the user to select different audio/visual information to play after an interruption command. In addition, in some embodiments, the user may define the duration of the interruption. Also, the system may adaptively respond to the way the user uses interruption features to automatically modify those features or to prompt the user to modify them.

34 Claims, 6 Drawing Sheets

INTERRUPTING PLAY OF AUDIO/VISUAL INFORMATION

BACKGROUND

This invention relates generally to processor-based systems and particularly to processor-based systems for controlling video and audio play.

A number of conventional consumer electronic devices control the play of video and/or audio information. As used herein, the term "audio/visual information" refers to data associated with video, audio, the combination of video and audio or the combination of video, audio and other information such as control information or text, as examples. Examples of consumer electronic equipment responsible for play of audio/visual information include digital video disks (DVD) players, compact disk (CD) players, hard disk drives, and video cassette recorders (VCRs). Examples of audio/video information formats include VCR cassette, audio tape, CD, DVD playback or real time play of television or Internet information. In addition, processor-based systems may be used to control the play of any of the above identified devices.

A processor-based system called a set top computer may be used to control the play of audio/visual information, for example on a conventional television receiver. Set top computers commonly sit on top of a television receiver and tune to an audio/visual transport medium.

In addition, processor-based technology may be incorporated into conventional appliances, including a variety of audio/visual information playback devices. The combination of the audio/visual information playback equipment with processor-based control enables the user to have greater influence over the way information is played. While the user may incur some additional costs for processor-based technology, the user can conceivably reap advantages in terms of better control.

Thus, there is a continuing need to provide better control of the play of audio/visual information using processor-based systems.

SUMMARY

In accordance with one aspect, a method for interrupting the play of audio/visual information includes detecting a request to interrupt audio/visual information play. The play of the audio/visual information is interrupted in response to such a command. A timer is initiated and after a timeout of the timer, the interrupted audio/visual information play is restored.

Other aspects are described in the accompanying detailed description and claims.

DETAILED DESCRIPTION

Figure 1:
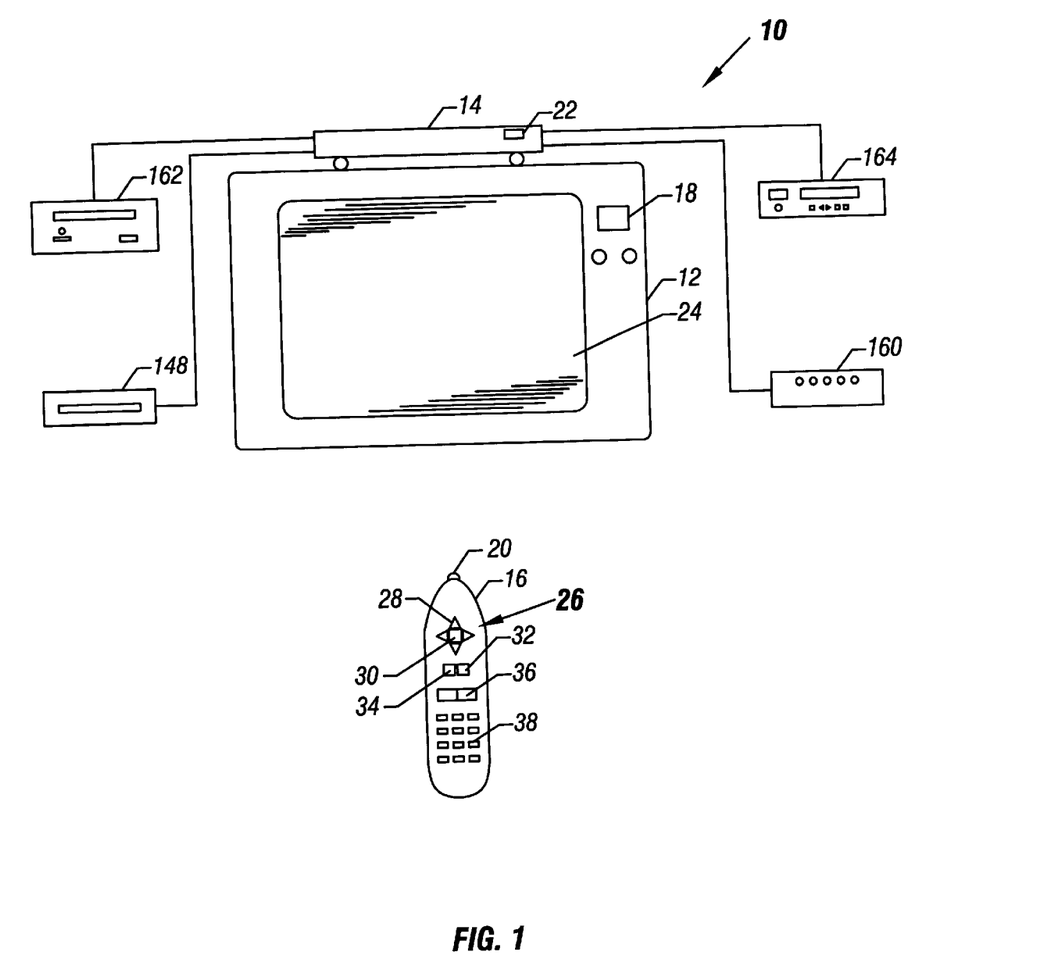
FIG. 1 is a side elevational view of one processor-based system in accordance with the present invention.

A processor-based system 10, shown in FIG. 1, may include a television receiver 12, a processor-based unit 14, which is illustrated as a set top computer, and a remote control unit 16 which may interact with the processor-based unit 14 and the television receiver 12. In particular, in one embodiment of the present invention, the remote control unit (RCU) 16 may include an infrared transceiver 20 which communicates with an infrared transceivers 18 and 22 on the television receiver 12 and the processor-based unit 14. The RCU 16 enables the user to input commands to control the display of audio/visual information on the receiver 12 including its display screen 24.

The processor-based system may be coupled to audio/visual information players such as CD/DVD player 162, a VCR 164, and a hard disk drive 148. In addition, a connection to the Internet may be afforded through a modem 160.

While the present is illustrated in connection with an embodiment using a set top computer system, other embodiments may include a variety of other arrangements including any of a variety of processor-based systems. Examples of processor-based systems that may control audio/visual information play include desktop computers, laptop computers, and appliances including consumer electronic equipment responsible for the playback of audio/visual information.

In one embodiment of the present invention, the RCU 16 includes a mouse control 26 which includes left, right and up and down cursor controls 28 and a left mouse select button 30. In addition, the RCU 16 may include a mute button 32, a pause button 34 and a combined mute/pause button 36. In addition, conventional numerical controls may be provided as indicated at 38. In some embodiments of the present invention, the RCU 16 may also function as a remote telephone receiving handset. In general, the RCU 16 allows the user to provide commands to the processor-based unit 14 for controlling the play of audio/visual information.

Figure 2:
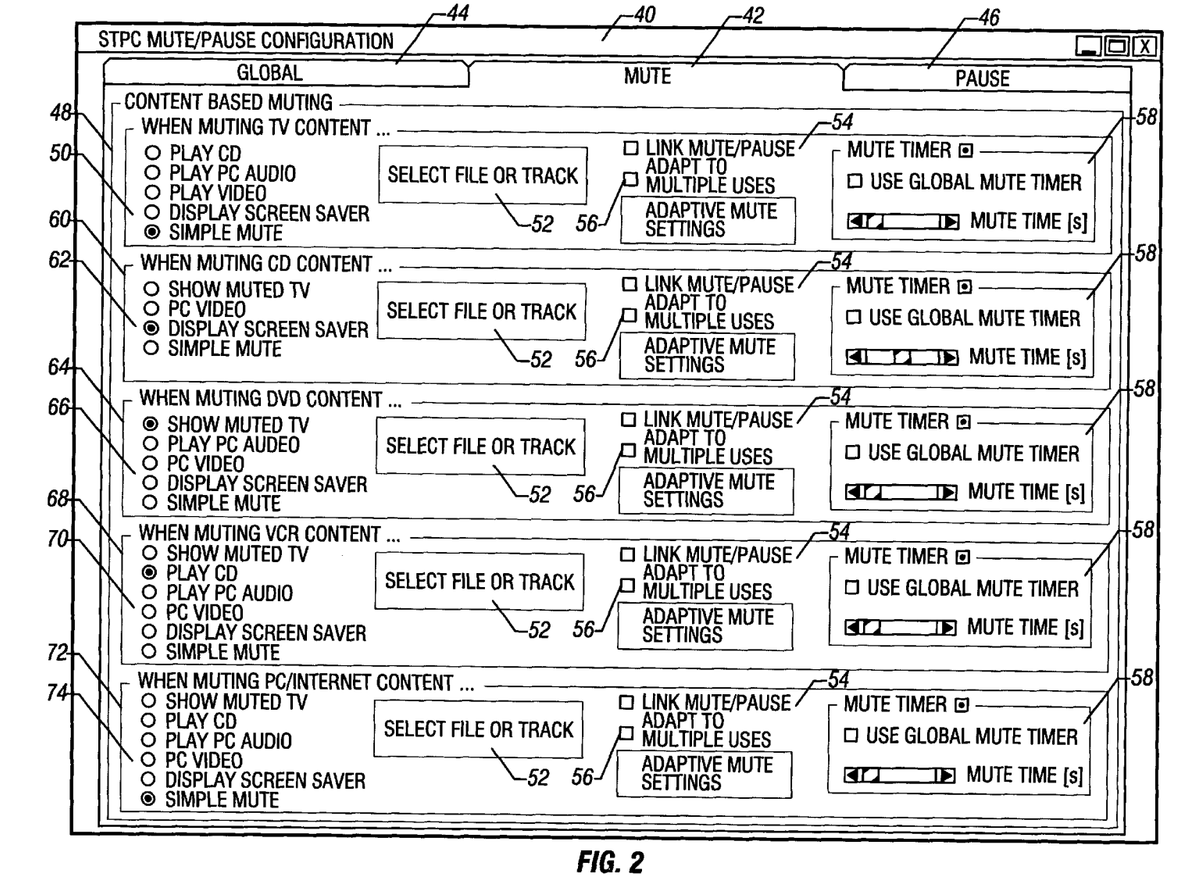
FIG. 2 shows a dialog box of a graphical user interface in accordance with one embodiment of the present invention.

A graphical user interface 40 illustrated in FIG. 2 in the form of a configuration dialog box, enables the user to select a variety of user selectable audio/visual information play interruption options. As used herein an audio/visual information play interruption may include an audio play interruption of the type accomplished through a mute feature or a video play interruption of the type accomplished through a pause feature. Each case involves a temporary cessation of audio/visual information presentation.

In one embodiment of the present invention, separate mute 42 and pause 46 graphical user interfaces are provided together with a global interface 44. Thus, in some embodiments, the user may set global configuration commands that are the same for both mute and pause interruptions. In other cases, the user may selectively determine configurations for mute and pause independently. A graphical user interface that is essentially the same as the mute interface 42 may be used for the global, mute and pause options. The only difference may be that instead of indicating "muting", as does the interface 42, the pause screen 46 may indicate "pausing", and the global screen 44 may indicate "muting or pausing".

The first set of configuration selections are audio/visual information content based as indicated at 48. This allows the user to provide alternate audio/visual content depending on the content that is playing when the interruption command is received. For example, if the user were watching TV content, and the user decided to answer a phone call, the user can input a selection at 50 which causes other audio/visual information to be automatically played during the interruption. As indicated at 50, other possibilities include playing a CD, playing PC audio, playing PC video, display a screen saver or a simple interruption which simply stops audio and video.

The user can select the file or track which will be played back during the interruption period by selecting the icon 52 labeled "select file or track". Upon operating the select file or track icon 52, for example by "pressing" the button 30 when a cursor is positioned on the icon, a graphical user interface appears which allows the user to give the file or track name for the information to be played during the interruption period. Since in this example the selection 50 is based on television content, generally the alternative or interruption content is a medium other than television.

A timer 58 may be selected to set a user definable time period for any interruption operation. That is, when the user selects an interruption, its time period is defined in accordance with the configuration setting entered through the icon 58. The time input icon 58 may include a scale which may cycle through a series of selectable times. The times increase when operating the right arrow or decrease when operating the left arrow, using the cursor and the button 30. When the selected time period is up, the interruption is automatically terminated and the TV content automatically resumes.

A configuration setting section 54 provides a number of additional user selections including linked mute/pause. Mute and pause may be linked through this particular feature. In such case, selecting mute or pause results in the same operation for the corresponding content type such as television. In this way, the user need not separately program the same function for both mute and pause operations. Although different definitions of mute and pause may abound, as used herein, "mute" refers to temporarily ceasing audio play and "pause" refers to temporarily ceasing both audio and visual play.

Figure 3:
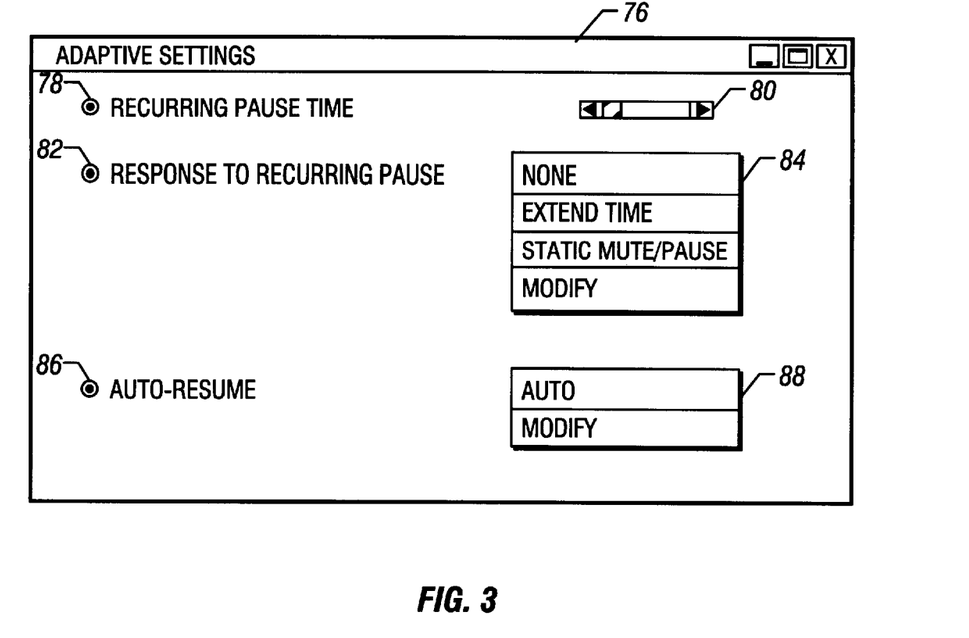
FIG. 3 shows a dialog box for a graphical user interface in accordance with another embodiment of the present invention.

Next, the user may select the adaptive mute setting icon 56. Selecting the icon 56 causes the system to automatically adapt to a variety of different user behaviors. Referring to FIG. 3, a graphical user interface 76, illustrated in the form of a configuration dialog box, allows the user to preset the type of adaptations automatically implemented by the processor-based system.

For example, referring to icon 78, a recurring pause time may be set. The system may be configured to watch for recurring interruptions and to extend the pause or mute persistence time when such interruptions occur repeatedly. Alternatively, it may automatically switch to a simple pause or mute after a number of consecutive uses of the mute or pause feature. The idea is that if the user is repeatedly interrupting play it may be disconcerting to continuing to insert other media for repeated short time intervals. Thus, it may be desirable to either increase the time of the interruptions or to simply terminate the play of other audio/visual information during the interruptions. The user can set the amount of time between sequential interruptions, which is deemed recurring, by inputting a time period, or a high or low indication, using the graphical user interface 80. The interface 80 includes left and right arrows to increase or decrease the time interval.

Referring next to icon 82, the user can also program the response to a recurring interruption such as a pause. As indicated at the icon 84, illustrated as a drop down menu, the response can vary from no response at all to extending the time of the pause or mute, selecting a static mute/pause, or modifying the programming on the fly. If modifying the programming on the fly is selected, the user may be prompted, after recurring pauses, to indicate whether the user wishes to automatically change the pre-programmed response to an interruption command. Alternatively, the user may set a global setting for his or her own user programmable response.

Next, the user can set an auto resume configuration as indicated at 86. The graphical user interface 88 allows the user to make the responses automatic or to provide a system prompt to the user to provide modifications at the time of the interrupt command. In the case of automatic response, when repeated interruptions occur, the interruption period may be linearly, progressively increased for interruptions which occur within a specified time period of a previous interruption. In some cases, a blinking message light with a short audible tone may alert the user to the activation of this feature.

Returning now to FIG. 2, the interface 60 allows the user to select the interrupt operation when CD content is being played. The user is offered essentially the same type of configurations 62 which were described previously. However, of course, when CD content is the main content, and that content is interrupted, television content may be substituted. Similarly, when DVD is the main content as indicated at 64, the user may be provided alternative play as indicated at 66 which may include muted television.

When the user mutes VCR content as indicated at 68, the user programmable selection 70 may include showing muted television, playing a CD, playing PC audio, playing PC video, display a screen saver or a simple mute. Similarly, when muting PC operations including Internet content as indicated at 72, a variety of other playback media, indicated at 74, may be offered. For example, the user can mute or pause a video game and substitute television or other audio/visual information in its place.

Figure 4:
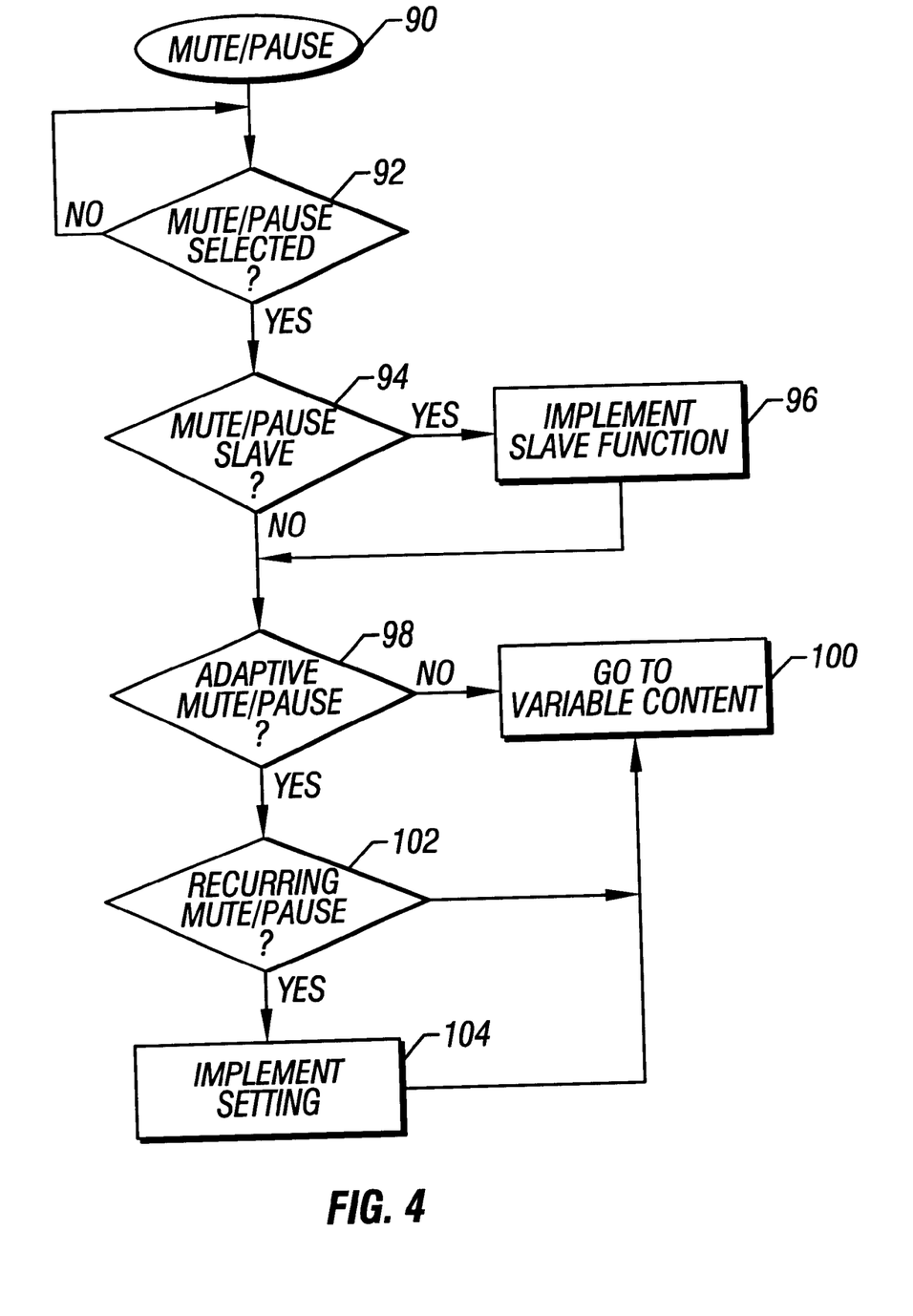
FIG. 4 is a flow chart for software for implementing one embodiment of the present invention.

Referring now to FIG. 4, software 90 for implementing one embodiment of the present invention, begins by determining whether an interruption has been selected, as indicated at diamond 92. If so, a check at diamond 94 determines whether mute and pause have been slaved together. If so, as indicated in block 96, the slave function is implemented wherein mute and pause are linked together. Thereafter, a check at diamond 98 indicates whether adaptive mute or pause has been selected. If not, the flow proceeds, as indicated in block 100, to the variable content flow illustrated in FIG. 5.

If adaptive mute or pause has been selected, an inquiry at diamond 102 determines whether a recurring mute or pause has occurred. If so, the user configuration settings (which may have been entered using the graphical user interface 76) are implemented and the flow proceeds to FIG. 5.

Figure 5:
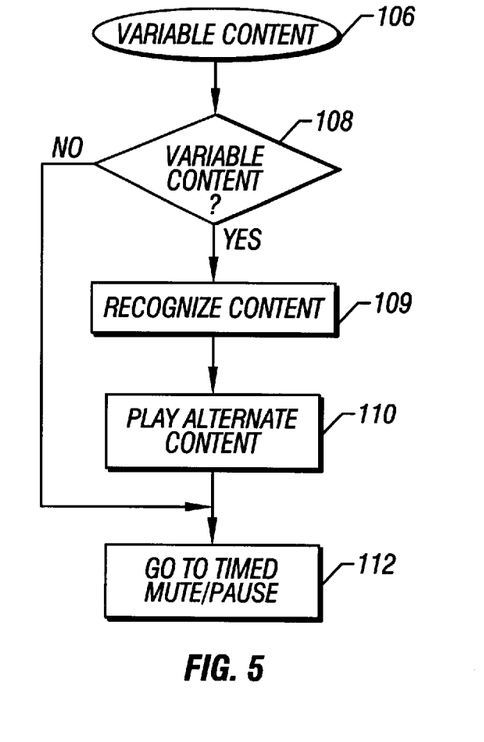
FIG. 5 is a flow chart for software for implementing another embodiment of the present invention.

As shown in FIG. 5, variable content configuration settings may be implemented by the software 106. Initially, an inquiry at diamond 108 determines whether variable content selections have been made for the various types of media which may be played. If the user has selected variable content, the system 10 must identify the medium currently playing (block 109). One way to do this is to identify and store the RCU 26 command to activate a player such as the VCR 164, hard disk drive 148 or CD/DVD player 162. The alternate content is played according to the primary audio/visual content active at the time mute or pause are selected, as indicated at block 110. Thus, as indicated in FIG. 2, depending on the content that was interrupted, a variety of different contents may be pre-selected by the user for play during the interruption period. Thereafter, as indicated in block 112, the flow proceeds to the timed mute or pause configuration section, shown in FIG. 6.

Figure 6:
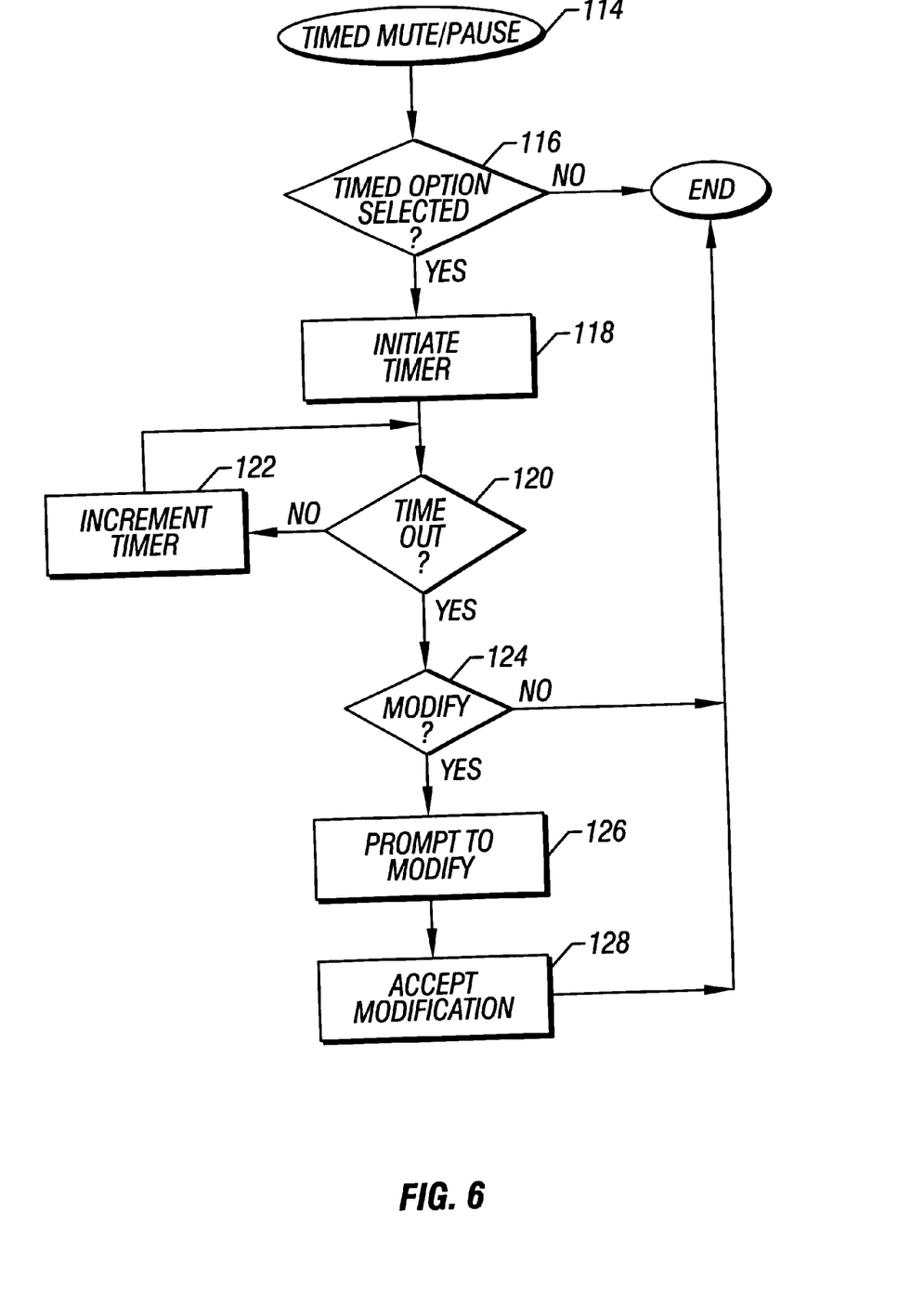
FIG. 6 is a flow chart for software for implementing still another embodiment of the present invention.

Referring next to FIG. 6, the software 114 for timed mute or pause is illustrated. Initially a check at diamond 116 determines whether the timed mute or pause option has been selected. If not, the flow is over. Otherwise, a timer is initialized as indicated in block 118. Conventionally, the timer is a software timer. At diamond 120 a check determines whether or not the timer has timed out. The amount of time to a time out may be selected by the user through the graphical user interface 58. If the timer has not timed out, the time is incremented as indicated in block 122 and the loop proceeds until a time out is detected.

After a time out is detected, a check at diamond 124 determines whether or not the user has selected the modify feature. The modify feature may be selected using the graphical user interface 88 in FIG. 3. If so, the user may be prompted to select modifications after recurring interruptions as indicated in block 126. At block 128, the system accepts and implements the modifications.

Figure 7:
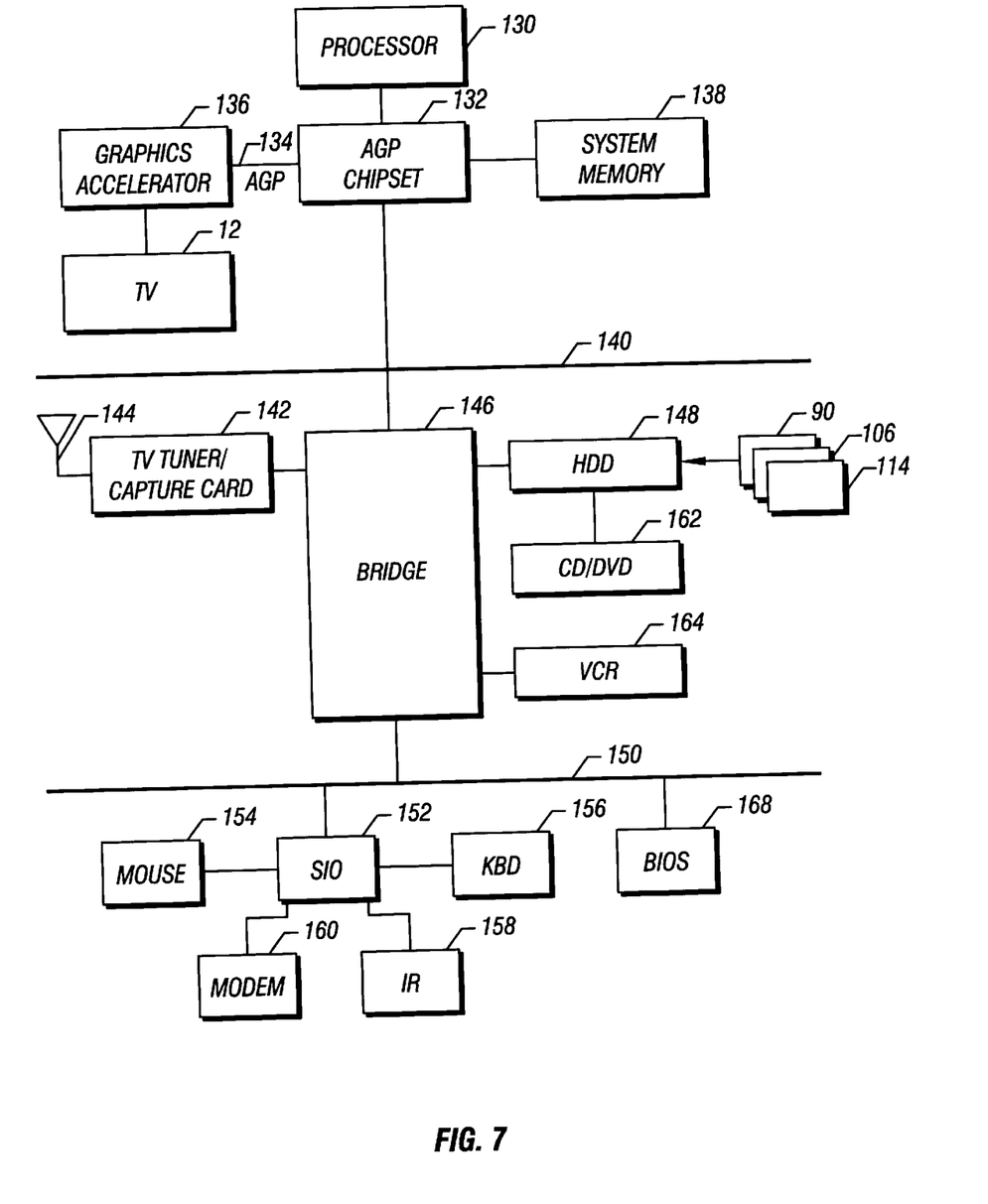
FIG. 7 is a schematic depiction of hardware for implementing the embodiment of the present invention shown in FIG. 1.

Turning now to FIG. 7, in accordance with one embodiment of the present invention, a system which implements a set top computer includes a processor 130. In one embodiment, the processor may be coupled to an accelerated graphics port (AGP) (See Accelerated Graphics Port Interface Specification, Revision 1.0, published on Jul. 31, 1996 by Intel Corporation, Santa Clara, Calif.) chipset 132 for implementing an accelerated graphics port embodiment. The chipset 132 communicates with the AGP port 134 and the graphics accelerator 136. The television 12 may be coupled to the video output of the graphics accelerator 136. The chipset 132 accommodates the system memory 138. The chipset 132 is also coupled to a bus 140. The bus 140 couples a TV tuner/capture card 142 which is coupled to an antenna 144 or other video input port, such as a cable input port, a satellite receiver/antenna or the like. The TV tuner and capture card 142 selects a desired television channel and also performs the video capture function. One exemplary video capture card is the ISVR-III video capture card available from Intel Corporation.

The bus 140 is also coupled to a bridge 146 which couples a hard disk drive 148, a CD/DVD player 162, and a VCR 164. The software 90 may be stored on the hard disk 148. The bridge 146 is also coupled to another bus 150. The bus 150 may be coupled to a serial input/output (SIO) device 152. The device 152 is in turn coupled to conventional components such as a mouse 154, a keyboard 156, an infrared interface 158 for communicating with the remote control unit 16, and a modem 160. Also connected to the bus 150 is a basic input/output system (BIOS) 168.

Through embodiments of the present invention, the user can select the response of the system to either muting, pausing or otherwise interrupting the play of audio/visual information. In some embodiments, the user can set up a timer which controls when to resume the play of the selected audio/visual information. The time out period may be configured by the user. In addition, in other embodiments of the present invention, the user can select a variety of different media to play during an interruption. Moreover, the user can provide different interruption media depending on the media playing when pause or mute was selected. Thus, the system can play musical selections or TV content automatically when transport based content is paused or muted.

A variety of graphical user interfaces have been described in connection with the present invention. Generally, these graphical user interfaces may be implemented by the processor 130. In particular, graphical user interfaces amount to data, files or other information which may be stored in various storage media on the system for execution and display by the processor-based system 10.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for interrupting the play of audio/visual information comprising:

detecting a request to interrupt audio/visual information play;

interrupting the play of the audio/visual information in response to said request;

initiating a timer; and after a time out of said timer, automatically restoring the interrupted audio/visual information from the point of interruption.

2. The method of claim 1 further including providing a graphical user interface to allow the user to selectively configure the time out duration of said timer.

3. The method of claim 2 further including providing a graphical user interface to enable the user to configure the time out duration differently for a variety of different audio/visual information media.

4. The method of claim 1 further including adaptively reconfiguring the time out duration based on the frequency of interruptions.

5. The method of claim 1 further including automatically initiating the play of other audio/visual information during the period between interrupting the audio/visual information playback and restoring the interrupted audio/visual information.

6. The method of claim 5 including enabling the user to selectively configure the format of information which is played during an interruption.

7. The method of claim 5 including providing the user with a graphical user interface to select a variety of media to be played during an interruption.

8. The method of claim 5 further including enabling the user to select video information to play when audio information has been interrupted.

9. The method of claim 5 further including enabling the user to select audio information for play when video information has been interrupted.

10. The method of claim 1 including interrupting said audio/video information in response to a pause command.

11. The method of claim 1 including interrupting said audio/visual information in response to a mute command.

12. The method of claim 1 including identifying the medium active when an interruption request is detected.

13. An article comprising a medium for storing instructions that, if executed, enable a processor-based system to:

detect a request to interrupt audio/visual information play;

interrupt the play of the audio/visual information in response to said request;

initiate a timer; and after a time out of said timer, restore the interrupted audio/visual information from the point of interruption.

14. The article of claim 13 further storing instructions that cause a processor-based system to provide a graphical user interface to allow the user to selectively configure the time out duration of said timer.

15. The article of claim 14 further storing instructions that cause a processor-based system to provide a graphical user interface to enable the user to configure the time out duration differently for a variety of different audio/visual information media.

16. The article of claim 13 further storing instructions that cause a processor-based system to adaptively reconfigure the time out duration based on the frequency of interruptions.

17. The article of claim 13 further storing instructions that cause a processor-based system to automatically initiate the play of other audio/visual information during the period between interrupting the audio/visual information playback and restoring the interrupted audio/visual information.

18. The article of claim 13 further storing instructions that cause a processor-based system to identify the medium active when an interruption request is detected.

19. A method for interrupting the play of audio/video information comprising:
   detecting a request to pause play of audio/visual information in a first medium;
   automatically terminating the play of audio/visual information in said first medium; and
   automatically initiating play of audio/visual information in a second medium.

20. The method of claim 19 further including automatically initiating the play of video information when said first medium is a form of audio information.

21. The method of claim 19 further including automatically initiating the play of audio information when said first medium includes video information.

22. The method of claim 19 further including programmably setting the duration of the automatic play of audio/visual information in said second medium.

23. The method of claim 22 further including providing a graphical user interface which enables the user to select the duration of the play of said second medium.

24. The method of claim 19 further including analyzing the frequency of interruptions and varying the response of the system depending on the frequency of interruptions.

25. The method of claim 24 wherein, after detecting a given interruption frequency, prompting the user to indicate whether or not the user wishes to change the user programmably selected play of a second medium.

26. An article comprising a medium for storing instructions that, if executed, enable a processor-based system to:
   detect a request to pause play of audio/visual information in a first medium;
   automatically terminate the play of audio/visual information in said first medium; and
   automatically initiate play of a audio/video information is a second medium.

27. The article of claim 26 further storing instructions that cause a processor-based system to analyze the frequency of interruptions and vary the response to the system depending on the frequency of interruptions.

28. A processor-based system comprising:
   a processor;
   a memory coupled to said processor;
   a first player coupled to said processor to play audio/visual information in a first medium;
   a second player coupled to said processor to play audio/visual information in a second medium; and
   said processor programmed to switch from playing said audio/visual information in the first medium to playing audio/visual information in said second medium in response to a pause command.

29. The system of claim 28 wherein said processor is programmed to automatically initiate play of video information when said first medium is in the form of audio information.

30. The system of claim 28 wherein said processor is programmed to automatically initiate play of audio information when said first medium includes video information.

31. A method for interrupting the play of audio/visual information comprising:
   detecting a request to mute play of audio/visual information in a first medium;
   automatically terminating the play of audio/visual information in said first medium; and
   automatically initiating play of audio/visual information in a second medium.

32. A method for interrupting the play of audio/visual information comprising:
   detecting a request to interrupt play of audio/visual information in a first medium;
   automatically terminating the play of audio/visual information in said first medium;
   automatically initiating play of audio/visual information in a second medium;
   analyzing the frequency of interruptions; and
   varying the response of the system depending on the frequency of interruptions.

33. The method of claim 32, wherein after detecting a given interruption frequency, prompting the user to indicate whether or not the user wishes to change the use of availably selected play of a second medium.

34. The method of claim 32 including detecting an interruption in the form of a pause request.

* * * * *